(12) United States Patent
Archer et al.

(10) Patent No.: US 11,048,620 B2
(45) Date of Patent: *Jun. 29, 2021

(54) DISTRIBUTED SYSTEM TEST DEVICE

(71) Applicant: INTERNATIONAL BUSINESS MACHINES CORPORATION, Armonk, NY (US)

(72) Inventors: Adam G. Archer, Toronto (CA); Herman S. Badwal, Markham (CA); Miran Badzak, Reading, MA (US); Robin Y. Bobbitt, Raleigh, NC (US); Mark T. Duquette, Tewksbury, MA (US); Christopher M. Lee-Shanok, Torono (CA); Robert Retchless, Toronto (CA); Lauren H. Schaefer, Newark, DE (US); Christopher N. Taylor, Newmarket (CA)

(73) Assignee: International Business Machines Corporation, Armonk, NY (US)

( * ) Notice: Subject to any disclaimer, the term of this patent is extended or adjusted under 35 U.S.C. 154(b) by 98 days.

This patent is subject to a terminal disclaimer.

(21) Appl. No.: 16/379,866

(22) Filed: Apr. 10, 2019

(65) Prior Publication Data

US 2019/0236000 A1 Aug. 1, 2019

Related U.S. Application Data

(63) Continuation of application No. 15/468,255, filed on Mar. 24, 2017, now Pat. No. 10,372,596.

(51) Int. Cl.
*G06F 11/00* (2006.01)
*G06F 11/36* (2006.01)

(52) U.S. Cl.
CPC ...... *G06F 11/3688* (2013.01); *G06F 11/3664* (2013.01); *G06F 11/3676* (2013.01); *G06F 11/3684* (2013.01); *G06F 11/3692* (2013.01)

(58) Field of Classification Search
CPC ............. G06F 11/3688; G06F 11/3664; G06F 11/3676; G06F 11/3684; G06F 11/3692
See application file for complete search history.

(56) References Cited

U.S. PATENT DOCUMENTS 8,868,981 B2  10/2014  Glaser et al.
9,026,998 B2  5/2015  Mizrahi
(Continued)

OTHER PUBLICATIONS

Peter Mell et al, The NIST Definition of Cloud Computing, National Institute of Standards and Technology, Publication 800-145, 2011, entire document.
(Continued)

*Primary Examiner* — Joseph D Manoskey
(74) *Attorney, Agent, or Firm* — Nicholas D. Bowman

(57) ABSTRACT

Aspects capture test coverage in a distributed system, wherein a processor instigates execution of a unique hypertext transfer request protocol test case within a distributed system of different, networked servers. The header of the unique test case includes a unique name for the unique test case, and the distributed system servers are each configured to, in response to processing a test case, generate a time-stamped log entry that includes header data for the processed test case and a uniform resource locator address of the processing server. The processor thus maps the unique test case to a subset of the distributed system servers as endpoint servers of the unique test case, in response to determining that the uniform resource locator addresses of each of the subset endpoint servers are listed within generated log entries of the endpoint servers in association with the unique test case name.

14 Claims, 5 Drawing Sheets

(56) References Cited

U.S. PATENT DOCUMENTS

| | | |
|---|---|---|
| 9,218,271 B2 | 12/2015 | Segall |
| 2005/0267976 A1 | 12/2005 | Chang |
| 2009/0019427 A1 | 1/2009 | Li et al. |
| 2010/0058295 A1 | 3/2010 | Johnson |
| 2013/0152047 A1* | 6/2013 | Moorthi ............... G06F 11/368 717/124 |
| 2015/0169432 A1* | 6/2015 | Sinyagin ............ G06F 11/3684 717/124 |
| 2015/0169435 A1 | 6/2015 | Wu |
| 2016/0048444 A1 | 2/2016 | Crova et al. |
| 2017/0046531 A1 | 2/2017 | Roberts |

OTHER PUBLICATIONS

Andrew Phillips, Networkworld, How to ensure the success of your Continuous Delivery initiative using testing, http://www.networkworld.com/article/2643098/software/how-to-ensure-the-success-of-your-continuous-delivery-initiative-using-testing.html, 2014, entire document.

Shiva Kolli, Automated Integration Testing & Continuous Integration for webMethods, Increase your webMethods ROI with CloudGen Automated Test Engine (CATE), http://cloudgensys.com/resources/webMethods-Automated-Testing-CATE-WhitePaper.pdf, 2015, entire document.

GITHUB, edrabc/traceability: A generic traceability component, https://github.com/edrabc/traceability, 2017, entire document.

U.S. Appl. No. 15/468,225, filed Mar. 24, 2017; Confirmation No. 1264.

* cited by examiner

| Server | Timestamp | Service | Testcase |
|---|---|---|---|
| 127.0.0.11 | | /add | testcase-2 |
| 127.0.0.11 | | /add | testcase-5 |
| 127.0.0.8 | | /authenticate | testcase-4 |
| 127.0.0.13 | | /delete | testcase-5 |
| 127.0.0.4 | | /login | testcase-2 |
| 127.0.0.4 | | /server-info | testcase-3 |
| 127.0.0.2 | | /login | testcase-4 |
| 127.0.0.13 | | /persist-info | testcase-3 |
| 127.0.0.7 | | /modify | testcase-3 |
| 127.0.0.2 | 31/Jan/2017:13:55:38 -0500 | /persist-info | testcase-1 |
| 127.0.0.3 | 31/Jan/2017:13:55:56 -0500 | /server-info | testcase-1 |
| 127.0.0.8 | 31/Jan/2017:13:55:58 -0500 | /query-server | testcase-1 |
| 127.0.0.5 | | /service | testcase-4 |

DISTRIBUTED SYSTEM TEST DEVICE

BACKGROUND

In a continuous deployment (CD) system, a key gating factor for each deployment is the cumulative test result obtained from a set of well written automated tests. Successful software teams commonly strive to run automated tests at each phase of the software delivery cycle so as to identify problems as early as possible. A key indicator of the quality of these tests is often defined as a function of the amount of the system exercised by a test run, generally referred to as their coverage. These teams also strive to produce a set of tests with as close to 100% coverage as possible. However, these two goals may conflict, as more comprehensive tests tend to take longer to execute.

In an attempt to mitigate the impact of a large number of potentially long running tests, developers are regularly faced with tough choices and may cut corners. For example, they may choose to only run a subset of the tests before submitting changes for continuous deployment. However, this can lead to lower throughput in the CD pipeline as bug-ridden submissions are reverted or amended as discovered.

SUMMARY

In one aspect of the present invention, a computerized method for capturing test coverage in a distributed system includes executing steps on a computer processor. Thus, a computer processor instigates execution of a unique hypertext transfer request protocol test case within a distributed system of different, networked servers, wherein a header of the unique test case includes a unique name for the unique test case, and wherein the distributed system servers are each configured to, in response to processing a test case, generate a time-stamped log entry that includes header data for the processed test case and a uniform resource locator address of the processing server. The processor thus maps the unique test case to a subset of the distributed system servers as endpoint servers of the unique test case, in response to determining that the uniform resource locator addresses of each of the subset endpoint servers are listed within generated log entries of the endpoint servers in association with the unique test case name.

In another aspect, a system has a hardware processor in circuit communication with a computer readable memory and a computer-readable storage medium having program instructions stored thereon. The processor executes the program instructions stored on the computer-readable storage medium via the computer readable memory and thereby instigates execution of a unique hypertext transfer request protocol test case within a distributed system of different, networked servers, wherein a header of the unique test case includes a unique name for the unique test case, and wherein the distributed system servers are each configured to, in response to processing a test case, generate a time-stamped log entry that includes header data for the processed test case and a uniform resource locator address of the processing server. The processor thus maps the unique test case to a subset of the distributed system servers as endpoint servers of the unique test case, in response to determining that the uniform resource locator addresses of each of the subset endpoint servers are listed within generated log entries of the endpoint servers in association with the unique test case name.

In another aspect, a computer program product for capturing test coverage in a distributed system has a computer-readable storage medium with computer readable program code embodied therewith. The computer readable hardware medium is not a transitory signal per se. The computer readable program code includes instructions for execution which cause the processor to instigate execution of a unique hypertext transfer request protocol test case within a distributed system of different, networked servers, wherein a header of the unique test case includes a unique name for the unique test case, and wherein the distributed system servers are each configured to, in response to processing a test case, generate a time-stamped log entry that includes header data for the processed test case and a uniform resource locator address of the processing server. The processor is thus caused to map the unique test case to a subset of the distributed system servers as endpoint servers of the unique test case, in response to determining that the uniform resource locator addresses of each of the subset endpoint servers are listed within generated log entries of the endpoint servers in association with the unique test case name.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
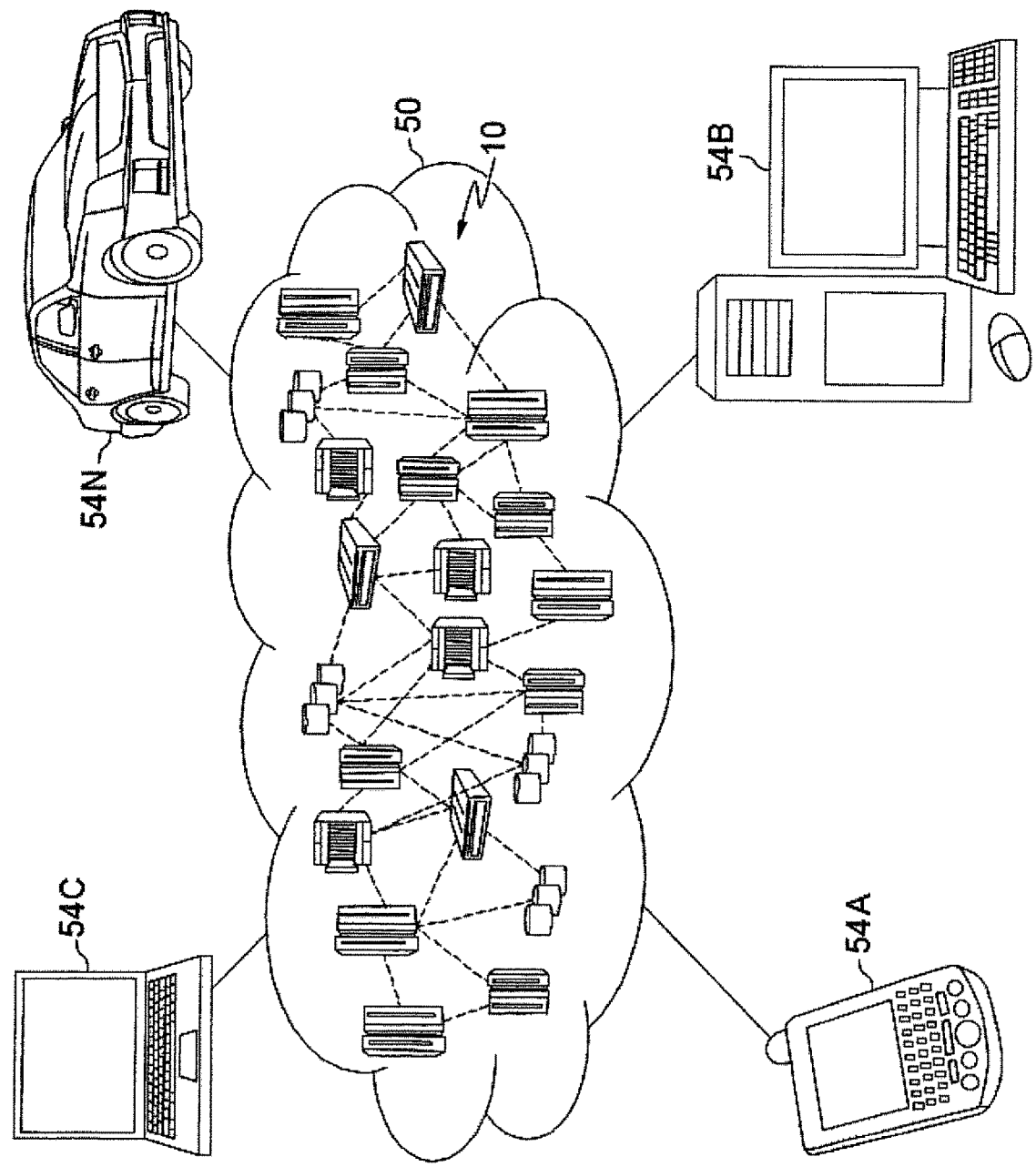
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
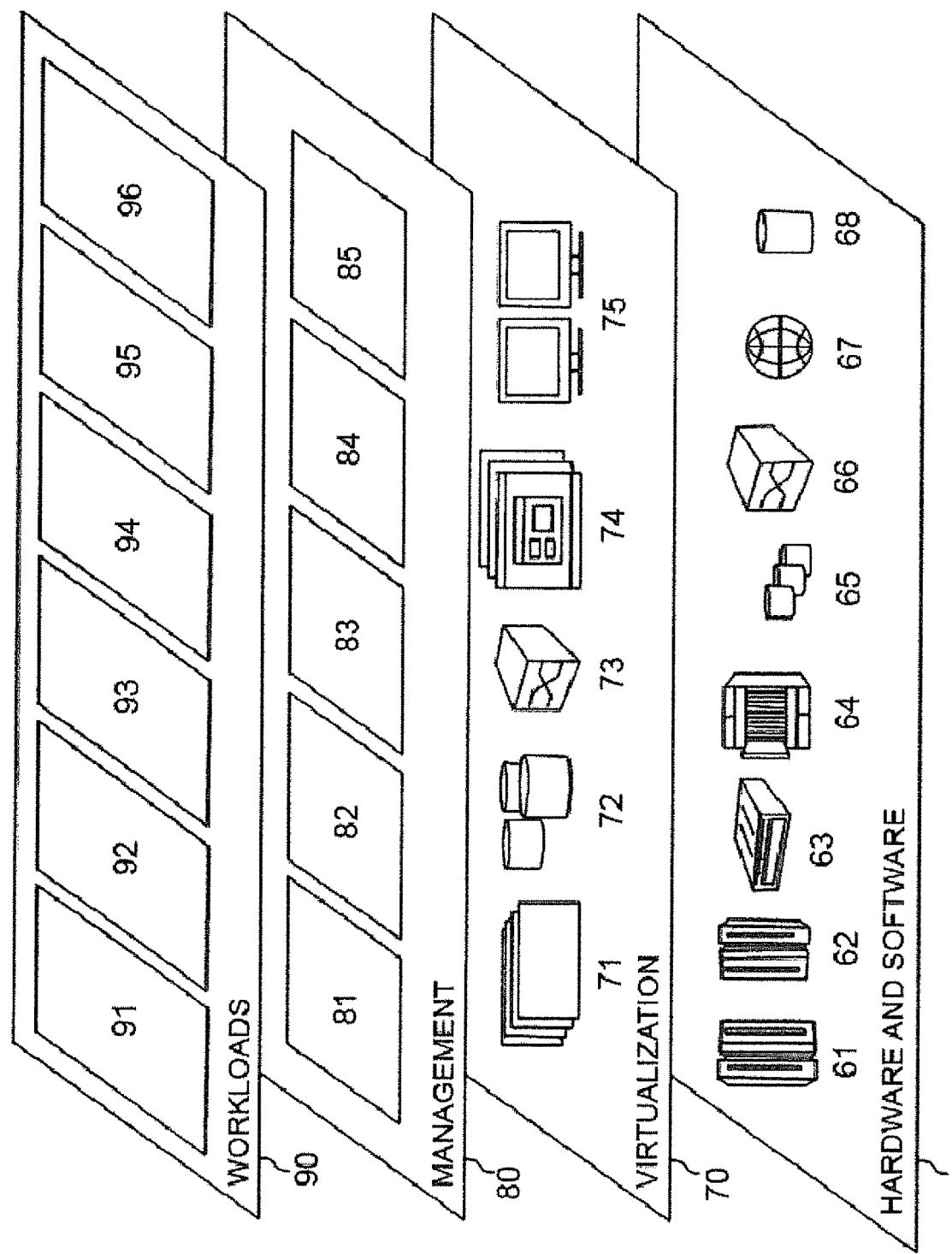
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for capturing test coverage in a distributed system 96.

Figure 3:
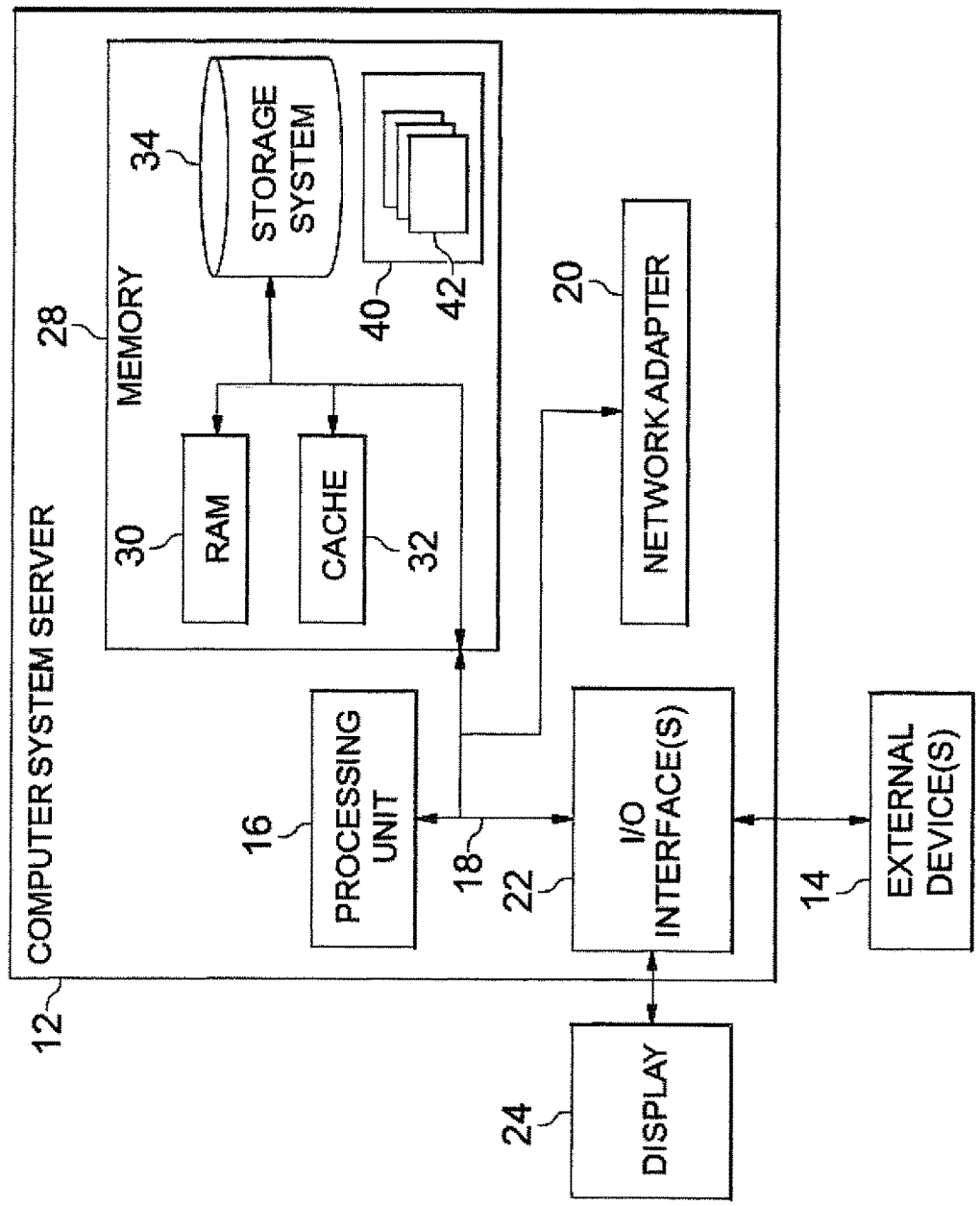
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
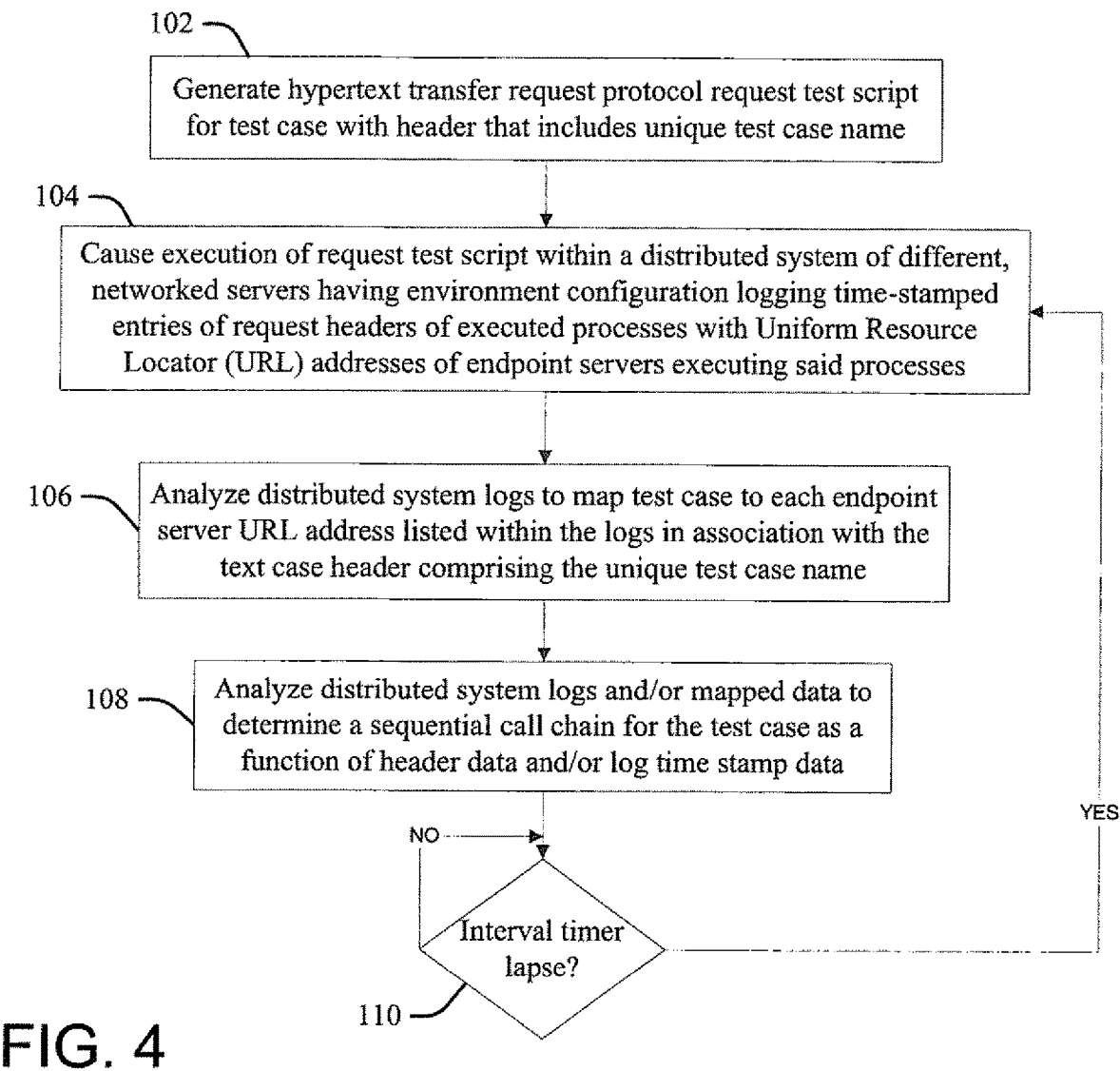
FIG. 4 is a flow chart illustration of an embodiment of the present invention.

FIG. 4 illustrates a process or system according to the present invention for capturing test coverage in a distributed system. At 102 a processor that is configured according to an aspect of the present invention (the "configured processor") generates a hypertext transfer request protocol (HTTP) request test script for a test case that includes a header that includes a unique name for the test case. The configured processor may be implemented in accordance with the computer system server 10 of FIG. 3, including as the cloud node 10 of FIG. 1, as described respectively above.

At 104 the configured processor injects into or otherwise causes (instigates) execution of the HTTP request test script within a distributed system that comprises a plurality of different, networked servers, the distributed system having an environment configuration wherein proxies and load balancers of the distributed system log time-stamped entries of the HTTP request headers of executed processes with the Uniform Resource Locator (URL) addresses of each endpoint server of the plurality of servers that performs a process associated with executing the test case. Accordingly, execution of the HTTP request test script within the distributed system at 104 causes proxies and load balancers to create individual process log entries that each list the test case header (including the identifying the unique name of the test case) along the URL address of one of the endpoint servers of the plurality of servers that are requested by or otherwise process the executed test case.

At 106 the configured processor analyzes the logs of the distributed system and thereby maps the test case to each of endpoint server URL addresses listed within the logs in association with the test case header comprising the unique test case name.

At 108 the configured processor analyzes the distributed system logs, and/or the mapped data determined at 106, to determine a sequential call chain for the test case as a function of the header data and/or the log time stamp data. The sequential call chain lists in sequential order all of the endpoint servers that are logged as processing and forwarding (to a next one of the endpoint servers) a request associated with executing the test.

At 110, in response to a lapse of an interval timer the configured processor performs another iteration of causing execution of the HTTP request test script within the distributed system at 104, analyzing the logs to map the test case the endpoint server URL addresses at 106 and determining a sequential call chain for the test case as a function of the log time stamp data at 108. Thus, the interval timer defines a periodic redefining, refining or refreshing of the mappings at 106 and 108, thereby ensuring that the mappings are accurate and useful in identifying which of the distributed system servers and processes interact with or are touched by the test case.

Figures 5, 6:
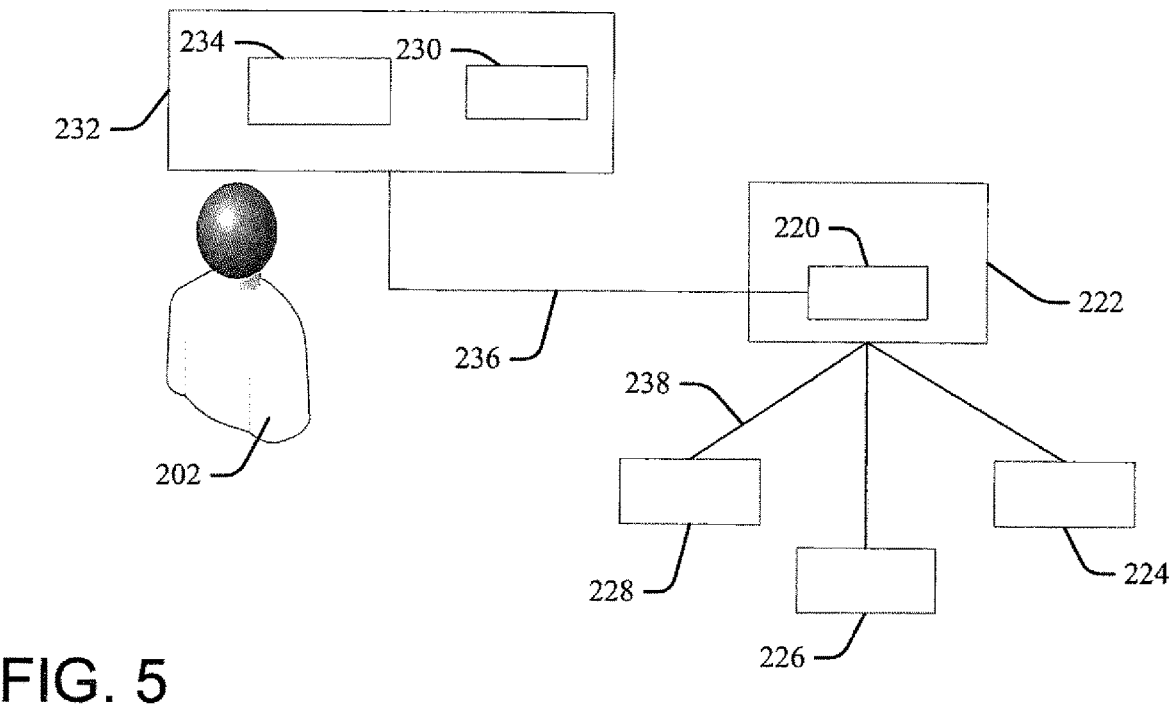
FIG. 5 is a block diagram illustration of an embodiment of the present invention.
FIG. 6 is a tabular illustration of an aspect of the present invention.

FIG. 5 illustrates one example implementation of an aspect of the present invention, wherein a user 202 uses a graphical user interface (GUI) display device 234 of a computerized device 232 to create or generate (at 102, FIG. 4) via a processor 230 that is configured according to an aspect of the present invention (the "configured processor") a hypertext transfer request protocol (HTTP) request test script for a test case that includes a header that includes a unique name for the test case.

The computerized device 232 is in circuit communication 236 with a processor 220 of a server 222 that is within a distributed system environment 238 with a group of other servers 228, 226 and 224. Within the distributed system environment 238 configuration proxy and load balancer processes of the servers 222, 228, 226 and 224 log time-stamped entries of the HTTP request headers of executed processes with the Uniform Resource Locator (URL) addresses of each endpoint server of the plurality of servers that performs a process associated with executing the test case. Thus, the configured processor 230 injects into or otherwise causes (instigates) execution of the HTTP request test script (at 104, FIG. 4) within distributed system environment 238 (via the server 222).

The configured processor 230 analyzes the logs of the distributed system servers 222, 228, 226 and 224 and thereby maps (at 106, FIG. 4) the test case to each of endpoint server URL addresses of respective ones of the servers 222, 228, 226 and 224 that are listed within the logs in association with the test case header comprising the unique test case name. The configured processor 230 further analyzes (at 108, FIG. 4) the distributed system logs, and/or the mapped data to determine a sequential call chain for the test case as a function of the header data and/or the log time stamp data.

In one example a test case "X" having a unique name "testcase-1" located within its header is created (at 102, FIG. 4) via the following pseudo script: {headers={'A-test-case', 'testcase-1'}; request ('GET', serviceToTest, headers)}.

The test case is injected into a distributed system (for example, the system 238, FIG. 5) wherein each server on the system uses the following logging configuration that updates the header data with a source of each request in a chain of requests: {"LogFormat "%h %l %t \"%r\" %>s %b \"%{Referer}i\" \"%{X-test-case}i\"" combined Custom-Log log/access_log combined}.

Executing the test case X generates initial processing on a first server of the distributed network, "System-1," that has an HTTP address 127.0.0.1, which results in generation of the following time-stamped entry into an access log for System-1: {127.0.0.1-[31/Jan/2017:13:55:36-0500] "GET/status HTTP/1.0" 200 2326" " "testcase-1"}.

In the processing of the test case X, System-1 forwards a request to another, different server within the distributed system, "System-2," that has an HTTP address 127.0.0.2. The request is processed by System-2, updating the header with the source of the request (System-1) and resulting in generation of the following time-stamped entry into an access log for System-2: {127.0.0.2-[31/Jan/2017:13:55:38-0500] "GET/server-info HTTP/1.0" 200 2326 "System-1" "testcase-1"}.

In processing the forwarded request System-2 forwards another request to another, different server within the distributed system, "System-3," that has an HTTP address 127.0.0.3. This request is processed by System-3, updating the header with the source of the request (System-2) and resulting in generation of the following time-stamped entry into an access log for System-3: {127.0.0.3-[31/Jan/2017:13:55:56-0500] "GET/server-info HTTP/1.0" 200 2326 "System-2" "testcase-1"}.

Lastly, in processing the forwarded request System-3 forwards another request to another, different server within the distributed system, "System-8," that has an HTTP address 127.0.0.8. This request is processed by System-8, updating the header with the source of the request (System-2) and resulting in generation of the following time-stamped entry into an access log for System-8: {127.0.0.3-[31/Jan/2017:13:55:58-0500] "GET/server-info HTTP/1.0" 200 2326 "System-3" "testcase-1"}.

FIG. 6 is a table illustration of a mapping determined (at 106, FIG. 4) for aggregated access log data for the distributed system of the present example, mapping each of a group of test cases (including the test case described above ("test case-1") and four other, different test cases ("test case-2", "test case-3", "test case-4" and "test case-5")) to different servers (having different URL addresses) with respect to the specific services executed by the mapped servers for the respective test cases.

A review of the access log data in the table of FIG. 6 determines (at 106, FIG. 4) that testcase-1 will access processes on the four different servers: a "/status" process on System-1 (identified by its URL 127.0.0.1); a "/persist-info" process on System-2 (URL 127.0.0.2); a "/server-info" process on System-3 (at URL 127.0.0.3) and a "/query-server" process "System-8" (URL of 127.0.0.8). Thus, if a change is made to the functionality of the "/persist-info" process in an application hosted at System-2 (127.0.0.2), a developer or other service provider determines from the mapping that testcase-1 and testcase-3 will both access (test) this service.

The service provider may also use the mapping and/or log data to identify changes in the call-sequence (determined at 110, FIG. 4) for a given test case, by comparing the call chains from different test runs. In the present example, the call chain is determined (at 110, FIG. 4) as a function of the header data, as the headers are updated as forwarded, indicating the order of the calls being made. Each logged header data indicates an origin of a request processed by the respective server. Thus, the initial "/status" call to System-1 (127.0.0.1) updates and forwards the header to System 2 (127.0.0.2) for the "/persist-info" process call, which updates and forwards the header to System-3 (127.0.0.3) for the "/server-info" call, which updates and forwards the header to System-8 (127.0.0.8) for the "/query-server" call.

One skilled in the art will appreciate that this is only one illustrative but not limiting or exhaustive example of a logging configuration, and users may implement aspects of the present invention with other, different logging configurations. The specific log file used in the example above can be any combination desired by an implementer. The only requirement is that enough information is persisted to the log such that the call-chain can be identified in a mapping, and that the test case name exists in the log files.

For example, wherein the header is not updated with an origin of the request, or to verify determinations made therefrom, aspects may also determine the call chains (at 110, FIG. 4) from comparing the time-stamp data for each test case log entry. Thus, the call chain of the present example may be determined by ranking occurrences of a testcase-1 within the aggregated log data by differences in time stamp value: the initial "/status" call to System-1 (127.0.0.1) has the earliest time stamp entry value (31/Jan/2017:13:55:36-0500) followed by System 2 (127.0.0.2) (31/Jan/2017:13:55:38-0500), then System-3 (127.0.0.3) (31/Jan/2017:13:55:56-0500), and lastly, System-8 (127.0.0.8) (31/Jan/2017:13:55:58-0500). Discrete call chain groupings of iterations of processing a given test case may be distinguished from other instances by their relative time-stamp values, for example if more than thirty seconds or some other threshold amount of time separates logged test case instances then the configured processor determines (at 110, FIG. 4) that they belong to different call chains.

Thus, aspects of the present invention identify the coverage of a given test before running the test in subsequent iterations. By understanding the coverage across various systems and services, the invention enables a developer to select the most appropriate sets of tests to execute in order to target specific portions of a distributed system.

Aspects of the present invention are independent of any programming language, enable traceability between any number of systems regardless of vendor, and do not specifically require the addition of specialized libraries at application compile time. Once the tracing structure according to the present invention is enabled on a server, test cases can be run and the service interactions recorded.

By implementing the proposed method, a system can be instrumented without requiring code changes thus removing the need for recompilation or instrumentation of the code. A developer can trace the impact of test cases on a particular set of services through the system via traditional log reviews or via log analysis tools. There is no requirement that the developer have physical access to other service provider services, as all tracing is network-based. Aspects enable developers and service providers to identify which test cases need to be executed in order to exercise a service being modified. Thus, a developer making a change to a particular service readily determines which test cases interact with the service via the determined mappings, and selects one or more of particular test cases that touch the service being modified as indicated in the log data; when deploying an updated service. By executing the selected test cases the developer is assured that the test cases most affected by the service change will be executed.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

instigating execution of a unique hypertext transfer request protocol test case within a distributed system that comprises a plurality of different, networked servers, wherein a header of the unique test case comprises a unique name for the unique test case, and wherein the distributed system servers are each configured to, in response to processing a test case, generate a time-stamped log entry that comprises header data for the processed test case and a uniform resource locator address of the processing server;

mapping the unique test case to a subset of the distributed system servers as endpoint servers of the unique test case, in response to determining that the uniform resource locator addresses of each of the subset endpoint servers are listed within generated log entries of the endpoint servers in association with the unique test case name; and determining a sequential call chain for execution of the unique test case by the subset endpoint servers as a function of the header data comprising the unique test case name within logged entries for each of the subset endpoint servers, and as a function of identifying a sequential series of time-stamps within logged entries for the subset endpoint servers that comprise the unique test case name.

2. The method of claim 1, further comprising:

integrating computer-readable program code into a computer system comprising a processor, a computer readable memory in circuit communication with the processor, and a computer readable storage medium in circuit communication with the processor; and wherein the processor executes program code instructions stored on the computer-readable storage medium via the computer readable memory and thereby performs the instigating execution of the unique hypertext transfer request protocol test case within the distributed system, the mapping the unique test case to the subset of the distributed system servers as endpoint servers of the unique test case, and the determining the sequential call chain for execution of the unique test case by the subset endpoint servers.

3. The method of claim 2, wherein the computer-readable program code is provided as a service in a cloud environment.

4. The method of claim 1, wherein the distributed system servers are each configured to update logged header data with a source of each test case request, the method further comprising:

determining the sequential call chain for execution of the unique test case by the subset endpoint servers as a function of identifying a sequential series of uniform resource locator addresses of the subset endpoint servers within logged entries for subsequent receiving ones of the subset endpoint servers that comprise the unique test case name.

5. The method of claim 1, further comprising:

determining, from a log entry generated by a first endpoint server of the subset endpoint servers in response to receiving and processing the unique test case, an identification of a process executed by the first endpoint server in processing the unique test case;

identifying, from another, different log entry generated by the first endpoint server in response to receiving and processing another test case that is different from the unique test case, the process identified as executed by the first endpoint server in processing the unique test case, in association with a different test case name from a header of the different test case; and identifying the unique test case and the another test case as a group of test cases that are each appropriate for selection to test the identified process.

6. The method of claim 1, wherein a logging device of each of the distributed system servers is configured to generate the time-stamped log entry that comprises the header data for the processed test case and the uniform resource locator address of the processing server in response to processing the test case, and wherein the logging device is selected from the group consisting of a proxy and a load balancer.

7. A system, comprising:
a processor;
a computer readable memory in circuit communication with the processor; and
a computer readable storage medium in circuit communication with the processor;
wherein the processor executes program instructions stored on the computer-readable storage medium via the computer readable memory and thereby:
instigates execution of a unique hypertext transfer request protocol test case within a distributed system that comprises a plurality of different, networked servers, wherein a header of the unique test case comprises a unique name for the unique test case, and wherein the distributed system servers are each configured to, in response to processing a test case, generate a time-stamped log entry that comprises header data for the processed test case and a uniform resource locator address of the processing server;

maps the unique test case to a subset of the distributed system servers as endpoint servers of the unique test case, in response to determining that the uniform resource locator addresses of each of the subset endpoint servers are listed within generated log entries of the endpoint servers in association with the unique test case name; and determine a sequential call chain for execution of the unique test case by the subset endpoint servers as a function of the header data comprising the unique test case name within logged entries for each of the subset endpoint servers, and as a function of identifying a sequential series of time-stamps within logged entries for the subset endpoint servers that comprise the unique test case name.

8. The system of claim 7, wherein the distributed system servers are each configured to update logged header data with a source of each test case request; and wherein the processor executes the program instructions stored on the computer-readable storage medium via the computer readable memory and thereby determines the sequential call chain for execution of the unique test case by the subset endpoint servers as a function of identifying a sequential series of uniform resource locator addresses of the subset endpoint servers within logged entries for subsequent receiving ones of the subset endpoint servers that comprise the unique test case name.

9. The system of claim 7, wherein the processor executes the program instructions stored on the computer-readable storage medium via the computer readable memory and thereby further:

determines, from a log entry generated by a first endpoint server of the subset endpoint servers in response to receiving and processing the unique test case, an identification of a process executed by the first endpoint server in processing the unique test case;

identifies, from another, different log entry generated by the first endpoint server in response to receiving and processing another test case that is different from the unique test case, the process identified as executed by the first endpoint server in processing the unique test case, in association with a different test case name from a header of the different test case; and identifies the unique test case and the another test case as a group of test cases that are each appropriate for selection to test the identified process.

10. The system of claim 7, wherein a logging device of each of the distributed system servers is configured to generate the time-stamped log entry that comprises the header data for the processed test case and the uniform resource locator address of the processing server in response to processing the test case, and wherein the logging device is selected from the group consisting of a proxy and a load balancer.

11. A computer program product for capturing test coverage in a distributed system, the computer program product comprising:

a computer readable storage medium having computer readable program code embodied therewith, wherein the computer readable storage medium is not a transitory signal per se, the computer readable program code comprising instructions for execution by a processor that cause the processor to:

instigate execution of a unique hypertext transfer request protocol test case within a distributed system that comprises a plurality of different, networked servers, wherein a header of the unique test case comprises a unique name for the unique test case, and wherein the distributed system servers are each configured to, in response to processing a test case, generate a time-stamped log entry that comprises header data for the processed test case and a uniform resource locator address of the processing server;

map the unique test case to a subset of the distributed system servers as endpoint servers of the unique test case, in response to determining that the uniform resource locator addresses of each of the subset endpoint servers are listed within generated log entries of the endpoint servers in association with the unique test case name; and determine a sequential call chain for execution of the unique test case by the subset endpoint servers as a function of the header data comprising the unique test case name within logged entries for each of the subset endpoint servers, and as a function of identifying a sequential series of time-stamps within logged entries for the subset endpoint servers that comprise the unique test case name.

12. The computer program product of claim 11, wherein the distributed system servers are each configured to update logged header data with a source of each test case request; and wherein the computer readable program code instructions for execution by the processor further cause the processor to determine the sequential call chain for execution of the unique test case by the subset endpoint servers as a function of identifying a sequential series of uniform resource locator addresses of the subset endpoint servers within logged entries for subsequent receiving ones of the subset endpoint servers that comprise the unique test case name.

13. The computer program product of claim 11, wherein the computer readable program code instructions for execution by the processor further cause the processor to:

determine, from a log entry generated by a first endpoint server of the subset endpoint servers in response to receiving and processing the unique test case, an identification of a process executed by the first endpoint server in processing the unique test case;

identify, from another, different log entry generated by the first endpoint server in response to receiving and processing another test case that is different from the unique test case, the process identified as executed by the first endpoint server in processing the unique test case, in association with a different test case name from a header of the different test case; and identify the unique test case and the another test case as a group of test cases that are each appropriate for selection to test the identified process.

14. The computer program product of claim 11, wherein a logging device of each of the distributed system servers is configured to generate the time-stamped log entry that comprises the header data for the processed test case and the uniform resource locator address of the processing server in response to processing the test case, and wherein the logging device is selected from the group consisting of a proxy and a load balancer.

* * * * *